E. T. BUSSELL.
CULTIVATOR AND HARROW.
No 106,118.  Patented Aug. 9, 1870.
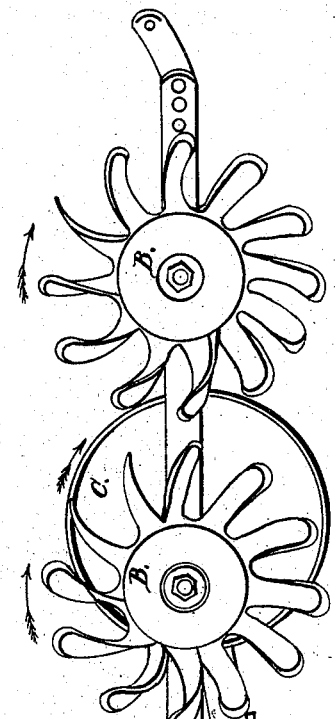
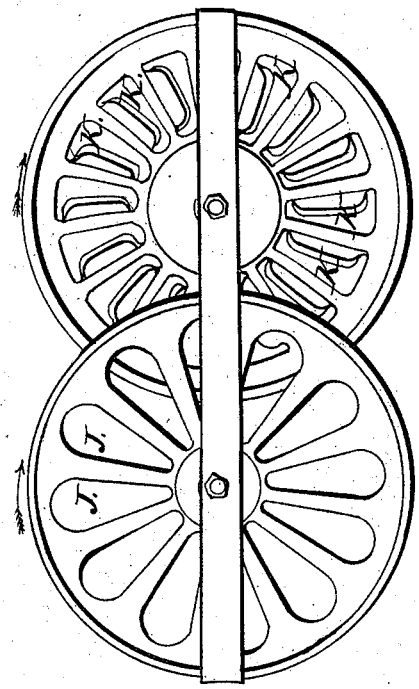
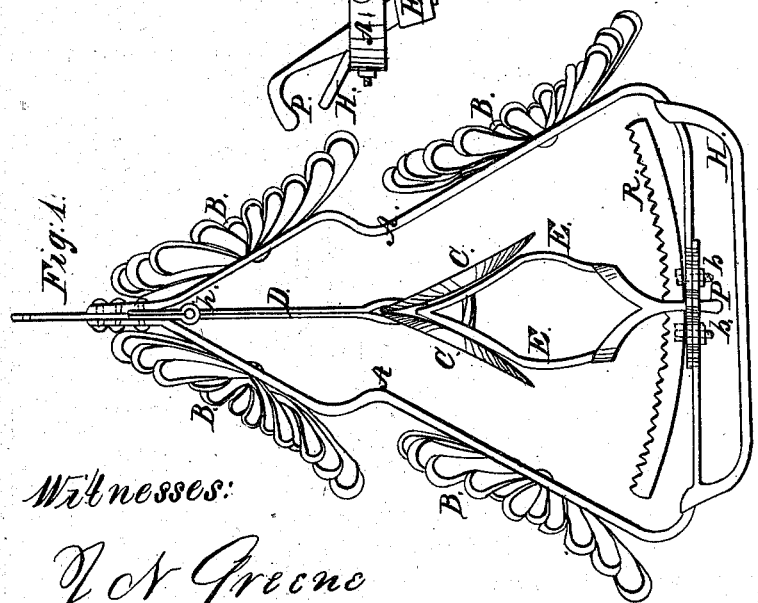
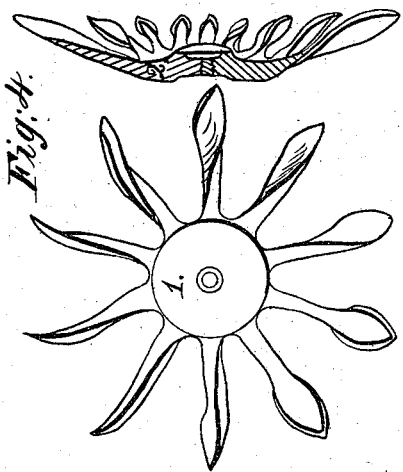
Witnesses:
J. N. Greene
J. Pickerill
Inventor:
Erastus T. Bussell

United States Patent Office.

ERASTUS T. BUSSELL, OF INDIANAPOLIS, INDIANA, ASSIGNOR TO HIMSELF AND JOHN N. GREENE, OF SAME PLACE, ASSIGNORS FOR ONE-THIRD THEIR RIGHT TO J. M. TILFORD, OF SAME PLACE.

Letters Patent No. 106,118, dated August 9, 1870.

IMPROVEMENT IN CULTIVATOR AND HARROW.

The Schedule referred to in these Letters Patent and making part of the same.

I, ERASTUS T. BUSSELL, of Indianapolis, in the county of Marion and State of Indiana, have invented certain Improvements in "Cultivators and Harrows," of which the following is a specification.

Nature and Objects of the Invention.

The first part of my invention relates to the use of a triangular frame for holding concavo-convex cultivator disks in such relation to each other that they will stir and pulverize all the soil within the range of the machine.

The second part of my invention relates to the use of a movable pair of similar disks, affixed to a jointed swinging bar in the middle of the machine, by which arrangement they perform the double function of splitting the ridge of earth left by the front pair of disks, and guiding and regulating the running of the whole machine.

Description of the Accompanying Drawing.

Figure 1 is a vertical view of my cultivator;
Figure 2 is a side elevation of fig. 1;
Figure 3 represents perforated disks, with continuous cutting-rims to the same; and
Figure 4 is intended to illustrate another form of serrated disk.

General Description.

A is a triangular-shaped frame, made of angle-iron, bar-iron, or other material. Angle-iron makes the best frame, and it should be one and a half inch face for a cultivator and two inch face for a harrow-frame. The harrow is only an enlarged cultivator, both made substantially alike. The frame A can be made to expand in width at the back end, or to narrow up, if so desired, as seen in fig. 1.

An inward offset must be made in the sides of this frame between the disks B, fig. 1, in order that each disk following another may cut into the edge of its furrow, thus stirring the entire surface.

The disks B B are made concavo-convex, and of any desirable diameter, say about fifteen inches. They may be serrated, having arms with blade extremities, fig. 2, or otherwise, as shown. They can be made wholly of cast-iron, or cast hubs and arms with thin steel blades bolted on these arms. The multidentate disks must be made in right and left-handed pairs, i e., the arms curving forward, and the front edge of their blade-points to be twisted outward slightly, say from a half to one inch from the rim-line. This feature causes them to penetrate easily, and brings up the subsoil, while shedding off the line dirt as they emerge from the ground.

The disks B may have their axles attached directly to the frame-bar A, or they may be axled to brackets that project below the frame A.

The V-shape of frame A must correspond in the angle of its sides, so that the front edge of the disks will sit parallel with the line of draft. Then they stand quartering across the furrow they cut, from necessity, and revolve easily, while they stir the soil effectually.

The disks C C are secured to the front end of frame A by a jointed bar, bifurcated, and forming the toggle E at their axle.

By means of the handle H this pair can be elevated and swung to either side, and thus give direction to the course of the whole machine, the machine shying to the opposite side, upon the same principle (reversed) that a boat yields to the influence of its rudder.

The legs of the handle P engage in a curved ratchet-bar, R, in the rear end of frame A when the disks C C are dropped into position for work, and hold them there until they are lifted into some other position.

The toggle E serves to hold the disks C C down when in working position.

The ratchet-bar R should be bolted to but one side of frame A, so as not to interfere with the expansion or contraction of the frame at its rear end, laterally.

The lapping ends of the sides of frame A should be held together at this point by bolts and nuts, and should have a series of holes through each, so as to admit of widening or narrowing of the frame at its rear end. But this same result may be attained by moving the disks B B (on each side) forward or backward on the frame with movable brackets, thus narrowing or widening the lateral position of the disks B B on one side from those on the other, by reason of the V-shape of the frame.

This machine is very light, easily drawn, does its work thoroughly, and can be managed as readily as a shovel-plow.

Having described my invention,
What I claim is—

A cultivator or harrow, composed of the wave-sided frame A, disks B B and C, the toggle E, and handle P, in connection with ratchet-bar R, arranged, combined, and co-operating in the manner described, and for the purposes set forth.

ERASTUS T. BUSSELL.

Witnesses:
WM. M. BUSSELL,
REN BUSSELL.